United States Patent
Roberts

(10) Patent No.: US 6,715,350 B2
(45) Date of Patent: Apr. 6, 2004

(54) AUTOMATIC TANK GAUGE SYSTEMS

(75) Inventor: Dale E. Roberts, Fort Worth, TX (US)

(73) Assignee: Practical Tank Management, Inc., Fort Worth, TX (US)

( * ) Notice: Subject to any disclaimer, the term of this patent is extended or adjusted under 35 U.S.C. 154(b) by 0 days.

(21) Appl. No.: 10/194,185

(22) Filed: Jul. 12, 2002

(65) Prior Publication Data

US 2004/0007060 A1 Jan. 15, 2004

(51) Int. Cl.[7] .................... G01F 23/30; G01F 23/36; I01F 23/30
(52) U.S. Cl. .................... 73/320; 73/305; 73/313; 340/620
(58) Field of Search ................ 73/304 R, 305, 73/313, 318, 320; 340/620

(56) References Cited

U.S. PATENT DOCUMENTS

| | | | | |
|---|---|---|---|---|
| 1,224,741 A | * | 5/1917 | Hewis | 200/11 G |
| 3,734,236 A | * | 5/1973 | Houtler | 182/121 |
| 3,972,234 A | * | 8/1976 | Osojnak | 73/303 |
| 4,065,226 A | * | 12/1977 | Campbell | 417/40 |
| 4,126,040 A | * | 11/1978 | Varacins et al. | 73/293 |
| 4,279,078 A | * | 7/1981 | Hinshaw et al. | 33/716 |
| 4,806,902 A | * | 2/1989 | Gana | 116/228 |
| 4,819,484 A | * | 4/1989 | White | 73/321 |
| 4,903,530 A | * | 2/1990 | Hull | 73/304 R |
| 5,117,693 A | * | 6/1992 | Duksa | 73/317 |
| 5,850,175 A | * | 12/1998 | Yeilding | 340/431 |
| 6,490,921 B2 | * | 12/2002 | Hagiwara | 73/305 |

* cited by examiner

Primary Examiner—Hezron Williams
Assistant Examiner—Katina Wilson
(74) Attorney, Agent, or Firm—Patton Boggs LLP

(57) ABSTRACT

A level sensor mechanism for detecting liquid levels in storage tanks. A conduit is provided having an upper portion and a lower portion. The conduit may be adapted to receive a cable therein, may be substantially rigid and adapted to resist deflection. A sensor assembly body is provided and adapted to locate a level sensor therein. The sensor assembly body may be located in fixed relation to said conduit, and may be rigidly composed and adapted to resist deflection. A coupling member may be secured to said lower portion of said conduit, said coupling member fixedly securing said conduit to said sensor assembly body, said sensor assembly body being secured on said offset portion of said coupling member. The level sensor mechanism may thereby resist or eliminate deflection through the construction of the conduit, coupling member and sensor assembly body.

29 Claims, 4 Drawing Sheets

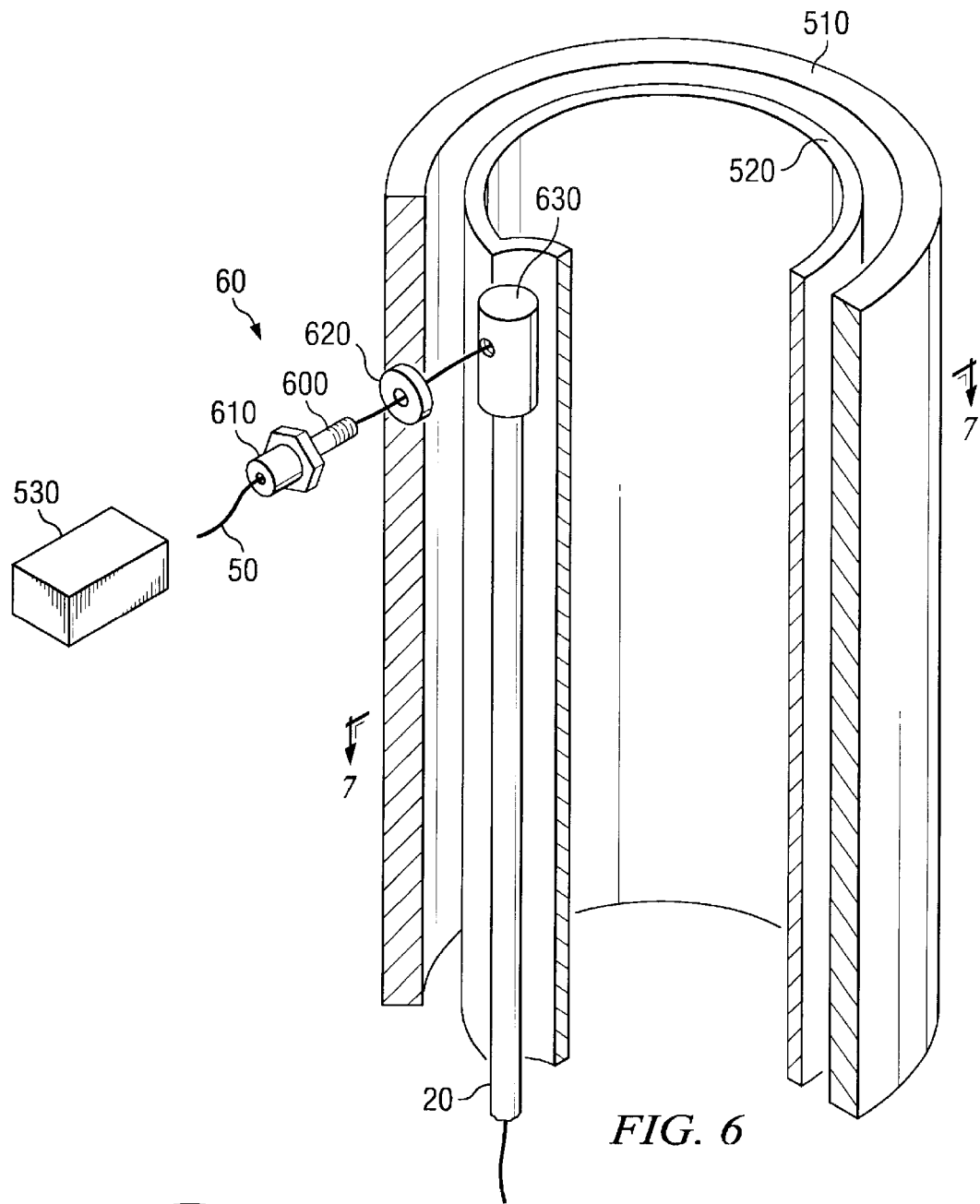
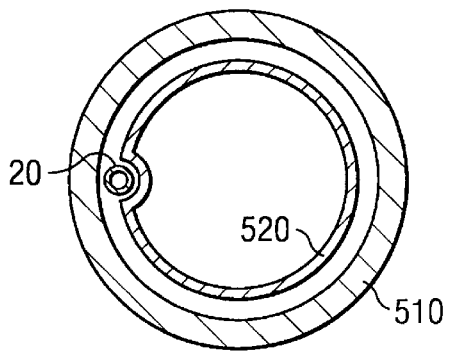
FIG. 6
FIG. 7

AUTOMATIC TANK GAUGE SYSTEMS

TECHNICAL FIELD

The present invention relates generally to level sensors for use in underground tanks, and in particular but not by way of limitation, to a level sensor mechanism that provides for simple insertion of the sensor into the tank, and allows the level sensor mechanism to fixedly place a level sensor therein for accurate level sensing.

BACKGROUND OF THE INVENTION

In typical underground tank storage systems, such as those used at fuel-filling stations, a tank fill pipe extends from ground level to a top portion of the tank. Within the tank fill pipe, a drop tube extends from ground level to a position near the bottom of the tank. There is a relatively small, set clearance between the tank fill pipe and the drop tube.

In the tank storage systems in which fuel is stored, the tanks may contain both fuel and water. These tanks are typically made of metal or ceramic materials, such as fiberglass. Level sensor mechanisms have been provided to detect both the fuel and water for many different reasons, such as ensuring an adequate fuel supply, tracking the amount of fuel in the tank, determining leakage in the tank, determining the amount of water in the tank, etc. Such level sensor mechanisms have included the use of floats and the like to either provide feedback based on the position of the floats, or to assist in maintaining a level sensor mechanism in proper position.

Other level sensor mechanisms have provided therewith shafts that extend to the bottom of the tank for stability, but are allowed to at least partially swing. These level sensor mechanisms at least partially swing through either the choice of materials provided on these level sensor mechanisms, which are typically metallic, through the use of buoyancy devices, such as floats and the like, or combinations thereof. These have proven problematic for several reasons.

First, these level sensor mechanisms may frictionally contact a surface of the tank. Over time, given that the liquid stored in the tank will repeatedly be drained and filled, the frictional contact will force a gradual wearing down of the tank, thereby exposing the environment to damage due to leakage of hazardous materials and the like stored therein. This problem is especially apparent when the level sensor mechanism has a metallic portion.

Second, the sensor inside of these level sensor mechanisms may provide aberrant feedback, given the movement of the level sensor mechanism over time. Re-calibration of theses sensors would therefore be required on a more frequent basis.

Third, the number of parts for these level sensor mechanisms may be excessive, especially when buoyancy devices are provided with the level sensor mechanisms. Because of the large number of tank storage systems, it is prohibitive to have intricate level sensor mechanisms that are costly.

Fourth, a majority of these level sensor mechanisms may have the additional problem of being difficult to install within a tank. Because these level sensor mechanisms typically have electrical wiring associated therewith, the level sensor mechanism is installed in an unused bung, which requires a disinterring of the tank and subsequent repair of the surface. This is both costly and disruptive.

SUMMARY OF THE INVENTION

To overcome these and other problems, the principles of the present invention provide for a level sensor mechanism for a storage tank. A conduit is provided having an upper portion and a lower portion. The conduit may be adapted to receive a cable therein, may be substantially rigid and adapted to resist deflection. A sensor assembly body is provided and adapted to locate a level sensor therein. The sensor assembly body may be located in fixed relation to said conduit, and may be rigidly composed and adapted to resist deflection.

A coupling member may be secured to said lower portion of said conduit, said coupling member fixedly securing said conduit to said sensor assembly body, said sensor assembly body being secured on said offset portion of said coupling member. The level sensor mechanism may thereby resist or eliminate deflection through the construction of the conduit, coupling member and sensor assembly body.

BRIEF DESCRIPTION OF THE DRAWINGS

These and other features, aspects, and advantages of the present invention will become better understood with regard to the following description, appended claims, and accompanying drawings, with like reference numerals denoting like elements where:

FIG. 6 is an exemplary partial isometric view of coupling means for the level sensor mechanism;

FIG. 7 is a cross-sectional view of the exemplary connector means taken along lines 7—7 of FIG. 6.

DETAILED DESCRIPTION

A level sensor mechanism for a tank storage system is provided which, after installation, fixedly depends into a tank. The level sensor mechanism provides feedback through a level sensor secured in the level sensor mechanism to an instrumentation system, which may be coupled to a display device. When the tanks are filled with the desired liquids, the level sensor mechanism remains in one position, which may thereby eliminate aberrant feedback from the sensor and may also reduce contact between the sensor level mechanism and the tank.

Figure 1:
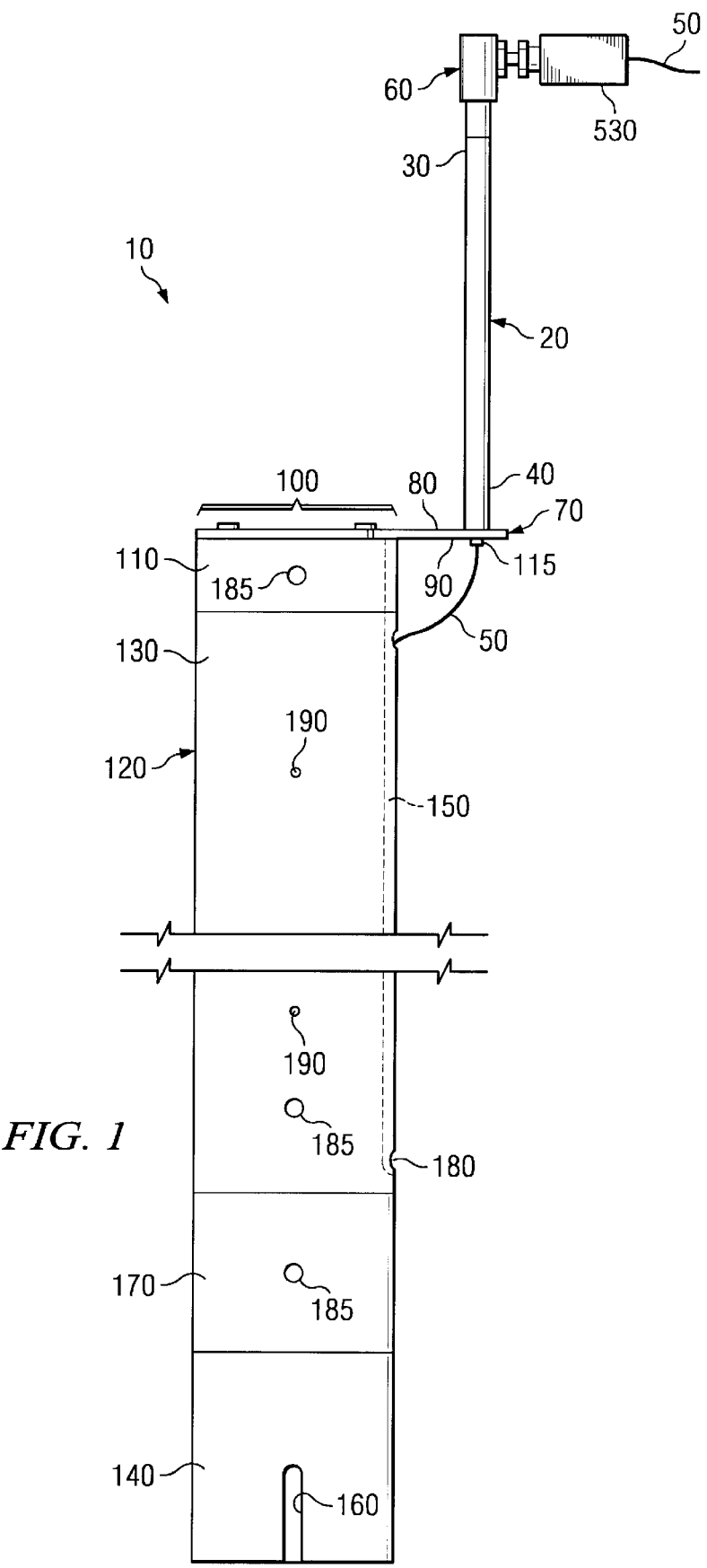
FIG. 1 is a side plan view of the level sensor mechanism in accordance with the principles of the present invention.

Referring first to FIG. 1, there is shown a side view of the level sensor mechanism 10 formed in accordance with the principles of the present invention. Level sensor mechanism 10 is designed for placement into a tank 500. Level sensor mechanism 10 includes a substantially rigid conduit 20 having an upper portion 30 and a lower portion 40, and is adapted to receive a cable 50 therein. The conduit 20 may be specifically adapted to resist or avoid deflection. A coupling means 60 is provided for coupling the conduit 20 to a tank fill pipe 510 (FIG. 5), and may abut a drop tube 520. The coupling means 60 facilitates connection of the level sensor mechanism 10 to the tank fill pipe 510 (FIG. 5), and may be hollow to provide a passageway for the cable 50 therethrough. The coupling means 60 is preferably adapted to prevent unnecessary contact of any external connection to the coupling means 60 with the drop tube 520.

Figure 2:
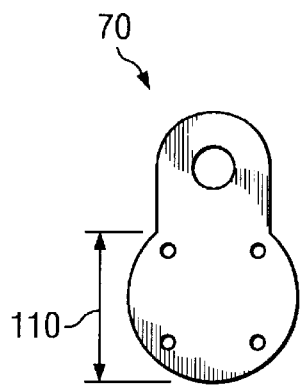
FIG. 2 is a top plan view of an exemplary coupling member for the level sensor mechanism of FIG. 1.
Figure 3:
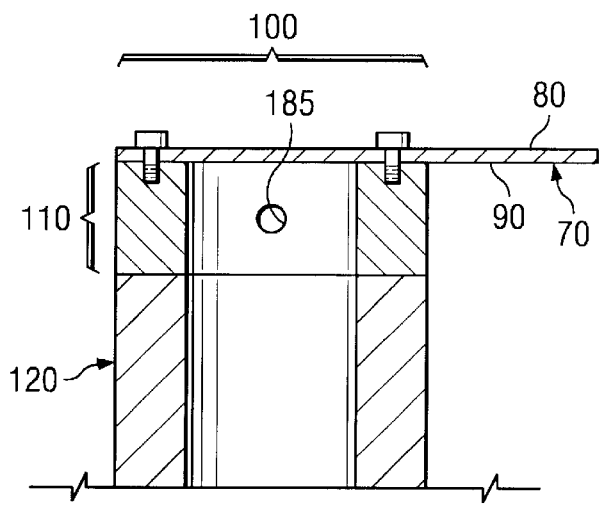
FIG. 3 is an exemplary side plan view of the coupling member of FIG. 2 connected to a sensor assembly body.

Referring now to FIGS. 1 through 3 in combination, a coupling member 70 having a first side 80 and a second side 90 secures to the lower portion 40 of the conduit 20. The first side 80 of the coupling member 70 includes an offset portion 100. The offset portion 100 is adapted to be secured to a modified collar portion 110 at the second side 90. The coupling member 70 may be coupled to the conduit 20 via fasteners 115 and the like, but in preferred embodiments, the coupling member 70 is welded to the conduit 20. Regardless of the connection, the fasteners 115 or welded portion is hollow to allow the cable 50 to pass therethrough. It is preferred that the composition of the coupling member 70 is anti-corrosive, such that the rigid coupling member 70 may be composed of stainless steel in some embodiments. It is also preferred that the coupling member 70 be rigid or substantially rigid for fixedly secured couplings.

Referring back to FIG. 1, a sensor assembly body 120 having an upper portion 130, a lower portion, 140, and an annular conduit 150. In the preferred embodiment, the sensor assembly body 120 is generally circular, but it is contemplated that the shape of the sensor assembly body 120 may be modified. The sensor assembly body 120 preferably has a circumference having an inner diameter greater than the modified collar portion 110, such that the modified collar portion 110 may fixedly secure the rigid coupling member 110 to the upper portion 130 of the sensor assembly body 120.

In certain preferred embodiments, the sensor assembly body 120 is constructed of a rigid material that resists or does not deflect, and does not react with gasoline or other chemicals stored in the tank. The sensor assembly body 120 is generally hollow and is open at the end adjacent the lower portion 140, such that liquid stored in the tank may fill the sensor assembly body 120 when the tank is filled. At the lower portion 140 of the sensor body, flow orifices 160 may be provided to facilitate entry and removal of the level sensor mechanism 10 in general, and the sensor assembly body 120 in particular from the tank.

Still referring to FIG. 1, a level sensor 170 is secured to the sensor body 120 in the lower portion 140. At least one sensor access opening 180 may be provided adjacent the position of the level sensor 170, to allow access to the level sensor 170 and any electrical connections extending therefrom. In a preferred embodiment, the level sensor 170 is electrically connected to the cable 50, which extends through the annular conduit 150. The level sensor 170 may be a transducer or other electronic element which is adapted to measure liquid levels in the tank.

The level sensor 170 may be secured to the sensor body 120 via fasteners and the like. A body opening 185 is provided as an example of how the level sensor 170 could secure to the sensor body 120 via a fastener. Body opening 185 may also be used to secure the modified collar portion 110 positioned on the sensor body 120. The level sensor could also be secure to the sensor body via an interference fit between the level sensor 170 and the sensor body 120.

The cable 50 connects from the level sensor 170 and is positioned within the annular conduit 150. An annular conduit opening 180 is provided on the sensor assembly 120, through which the cable may pass. From the annular conduit opening 180, the cable 50 is positioned within the lower portion 40 of the conduit 20 and may be sealed therein via epoxy or other such sealants. It is also contemplated that the cable 50 may be sealed within the annular conduit 150, although such sealing would make cable repairs and changes difficult. In a preferred embodiment, the cable 50 is preferably a jacketed coaxial cable which is impervious to gasoline and other chemicals.

Figure 5:
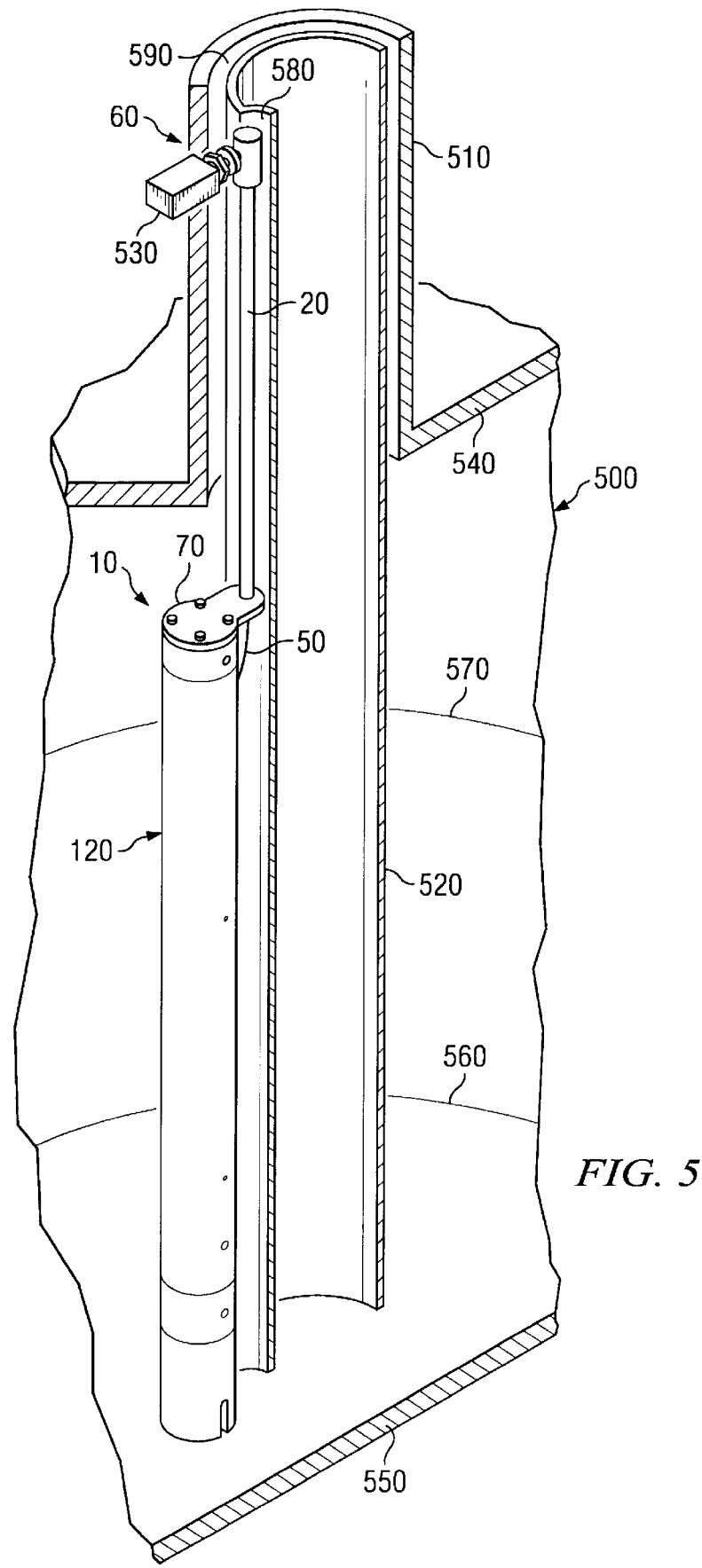
FIG. 5 is a partial isometric view of the level sensor assembly of FIG. 1 in a storage tank.

Referring to FIGS. 1 and 5 in combination, about the circumference of the sensor assembly body 120 are provided calibration points 190. Calibration points 190 are placed in predetermined positions on the sensor assembly body 120, such that the level sensor 170 may be periodically calibrated based on the positions of the calibration points 190. Also, several openings may be provided about the circumference of the sensor assembly body 120 to provide entry and exit points for fluids in the tank 500.

Figure 4:
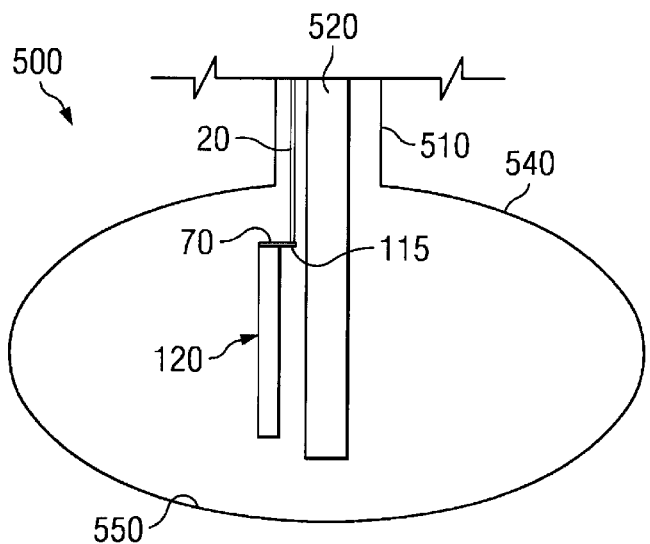
FIG. 4 is an exemplary schematic of the installation in a storage tank of the level sensor mechanism of FIG. 1.

Referring now to FIGS. 4 and 5 in combination, there is shown a side view of the tank 500, tank fill pipe 510, drop tube 520 and level sensor mechanism 10 in a partial isometric view. The level sensor mechanism 10 is shown adjacent to the drop tube 520 and secured thereto by coupling means 60. The coupling means 60 facilitates connection between external connections 530 and conduit 20. The tank 500 is shown having a top 540 and a bottom 550. A water level 560 and a fuel level 570 are shown in the tank 500.

Still referring to FIG. 5, the conduit 20 is suspended between the drop tube 520 and the tank fill pipe 510. The rigid coupling member 70 couples the conduit 20 to the level sensor body 120. In this embodiment, the level sensor body 120 is in a parallel configuration with the drop tube 520, and may rigidly depend into the tank 500, regardless of the fluid levels 560, 570. Cable 50 is shown between the level sensor body 120 and the conduit 20 for providing communication between external connections 530 and the level sensor mechanism 170 (FIG. 1).

Referring now to FIG. 6, there is shown a partial isometric view of the tank fill pipe 510, the drop tube 520, the conduit 20, the coupling means 60 and the external connections 530. External connections 530 in this embodiment comprise a threaded coupler 600 connected to a nipple portion 610, a bracket 620, and a coupling body 630. The threaded coupler 600 is adapted to connect through the bracket 620 to a coupling body 630. The coupling body 630 prevents the threaded coupler 600 from contacting the drop tube 520 and secures the threaded coupler 600 to the conduit 20. Such coupling means 60 is designed to be non-explosive, and may include other sealing devices such as an O-ring and the like. External connections 530 may be provided and adapted to connect to the cable 50 and to the nipple portion 610.

Installation of the level sensor assembly 10 is accomplished with the tank 500 buried underground. First, the drop tube 520 is removed from the tank fill pipe 510. Next, a hole is provided in the side of the tank fill pipe 510. Typically, a drop tube 520 having a vertically-extending, concave indentation 580 may be utilized. The level sensor assembly 10 is rotated to an insertion position and locked in position by the coupling means 60. Then, the level sensor assembly 10 is lowered, sensor assembly body 120 first, through the tank fill pipe 510 into the tank 500.

When the sensor assembly body 120 reaches the tank bottom 550, the conduit 20 may be rotated to offset the sensor assembly body 120 via coupling member 70. Thereafter, cables 50 may be secured to external connections 530 and to monitoring systems, such as a personal computer, for monitoring water and gasoline levels 560, 570, respectively, or for monitoring the absence of such levels in the tank 500.

It should be understood that there are many aspects to the level sensor assembly apparatus and method, and the scope of the principles of the present invention should not necessarily be limited by the description found herein. It is thus believed that the operation and construction of the principles of the present invention will be apparent from the foregoing description of the preferred exemplary embodiments. It will be obvious to a person of ordinary skill in the art that various changes and modifications may be made herein without departing from the spirit and the scope of the invention.

The scope of the present invention is instead defined by the following claims.

What is claimed is:

1. A level sensor mechanism for a storage tank, comprising:
    a conduit having an upper portion and a lower portion, said conduit being adapted to receive a cable therein, said conduit being substantially rigid and adapted to resist deflection;
    a sensor assembly body adapted to locate a level sensor therein, said sensor assembly body being located in fixed relation to said conduit, said sensor assembly body being rigidly composed and adapted to resist deflection;
    a coupling member secured to said lower portion of said conduit, said coupling member fixedly coupling said conduit to said sensor assembly body, said sensor assembly body being coupled on an offset portion of said coupling member; and
    at least one opening located on said sensor assembly for allowing access to said sensor and said cable, and for allowing air and liquid in the storage tank to pass therethrouqh.

2. The level sensor mechanism of claim 1, further comprising:
    coupling means for coupling said conduit to a tank fill pipe, said conduit extending downward from said coupling means.

3. The level sensor mechanism of claim 1, further comprising:
    a modified collar portion secured to said sensor body and said coupling means, said modified collar portion having a diameter smaller than an inner diameter of said sensor assembly body and secured therein.

4. The level sensor mechanism of claim 1, further comprising:
    a cable conduit positioned in said sensor assembly body, said cable conduit being adapted to receive cable from a sensor.

5. The level sensor mechanism of claim 1, further comprising:
    coupling means for connecting said upper portion of said conduit to a tank fill pipe.

6. The level sensor mechanism of claim 5, wherein said coupling means comprises:
    a threaded coupler;
    a nipple portion secured to said threaded coupler; and
    a coupling body engaging said threaded coupler and said conduit.

7. The level sensor mechanism of claim 1, wherein the level sensor is displaced at an end of said sensor assembly body.

8. The level sensor mechanism of claim 1, wherein the level sensor is adapted to detect liquid levels in relation to the level sensor.

9. The level sensor mechanism of claim 8, wherein the level sensor communicates detected liquid levels to an external location via said cable.

10. A level sensor mechanism, comprising:
    a substantially rigid conduit adapted to receive a cable therein;
    a substantially rigid sensor assembly body adapted to locate a level sensor therein;
    a coupling member coupling said conduit to said sensor assembly body;
    means for offsetting said sensor assembly body from said conduit; and
    coupling means for coupling said conduit to a tankful pipe, said conduit extending downward from said coupling means.

11. The level sensor mechanism of claim 10, wherein said level sensor is displaced at an end of said substantially rigid sensor assembly body.

12. The level sensor mechanism of claim 10, further comprising:
    means for connecting said conduit to a tank fill pipe.

13. The level sensor mechanism of claim 10, wherein said level sensor is adapted to detect liquid levels.

14. The level sensor mechanism of claim 11, wherein said level sensor communicates detected liquid levels to an external location via said cable.

15. The level sensor mechanism of claim 10, wherein the level sensor mechanism is adapted to be placed in a storage tank having liquids therein.

16. The level sensor mechanism of claim 11, wherein said substantially rigid conduit and said substantially rigid sensor assembly body are adapted to resist deflection caused by liquids in said storage tank.

17. A level sensor mechanism, comprising:
    means for inserting the level sensor mechanism in a storage tank;
    means for connecting a sensor assembly body having a level sensor therein to a substantially rigid conduit;
    means for guiding a cable through said means for inserting the level sensor mechanism;
    means for rotating the level sensor mechanism about an axis while maintaining a fixed relationship between said sensor assembly body and said substantially rigid conduit;
    means for electrically connecting the level sensor to an external location;
    means for measuring a liquid level in said storage tank and for communicating the liquid level to said external location; and
    means for removing the level sensor mechanism from said storage tank.

18. A level sensor mechanism, comprising:
    a conduit having an upper portion and a lower portion, said conduit being adapted to receive a cable therein, said conduit being substantially rigid and adapted to resist deflection;
    a sensor assembly body adapted to locate a level sensor therein, said sensor assembly body being located in fixed relation to said conduit, said sensor assembly body being rigidly composed and adapted to resist deflection;

a coupling member secured to said lower portion of said conduit, said coupling member fixedly coupling said conduit to said sensor assembly body, said sensor assembly body being coupled on an offset portion of said coupling member; and coupling means for coupling said conduit to a tank fill pipe, said conduit extending downward from said coupling means.

19. The level sensor mechanism of claim 18, further comprising at least one opening located on said sensor assembly for allowing access to the sensor and the cable, and for allowing air and liquid to pass therethrough.

20. The level sensor mechanism of claim 18, further comprising:

a cable conduit positioned in said sensor assembly body, said cable conduit being adapted to receive the cable from a sensor.

21. The level sensor mechanism of claim 18, further comprising:

coupling means for connecting said upper portion of said conduit to a tank fill pipe.

22. A level sensor mechanism for a storage tank, comprising:

a conduit having an upper portion and a lower portion, said conduit being adapted to receive a cable therein, said conduit being substantially rigid and adapted to resist deflection;

a sensor assembly body adapted to locate a level sensor therein, said sensor assembly body being located in fixed relation to said conduit, said sensor assembly body being rigidly composed and adapted to resist deflection;

a coupling member secured to said lower portion of said conduit, said coupling member fixedly coupling said conduit to said sensor assembly body, said sensor assembly body being coupled on an offset portion of said coupling member; and a cable conduit positioned in said sensor assembly body, said cable conduit being adapted to receive cable from a sensor.

23. The level sensor mechanism of claim 22, further comprising:

at least one opening located on said sensor assembly for allowing access to said sensor and said cable, and for allowing air and liquid in the storage tank to pass therethrough.

24. The level sensor mechanism of claim 22, further comprising:

coupling means for coupling said conduit to a tank fill pipe, said conduit extending downward from said coupling means.

25. The level sensor mechanism of claim 22, further comprising:

coupling means for connecting said upper portion of said conduit to a tank fill pipe.

26. A level sensor mechanism for a storage tank, comprising:

a conduit having an upper portion and a lower portion, said conduit being adapted to receive a cable therein, said conduit being substantially rigid and adapted to resist deflection;

a sensor assembly body adapted to locate a level sensor therein, said sensor assembly body being located in fixed relation to said conduit, said sensor assembly body being rigidly composed and adapted to resist deflection;

a coupling member secured to said lower portion of said conduit, said coupling member fixedly coupling said conduit to said sensor assembly body, said sensor assembly body being coupled on an offset portion of said coupling member; and coupling means for connecting said upper portion of said conduit to a tank fill pipe.

27. The level sensor mechanism of claim 26, further comprising:

at least one opening located on said sensor assembly for allowing access to said sensor and said cable, and for allowing air and liquid in the storage tank to pass therethrough.

28. The level sensor mechanism of claim 26, further comprising:

coupling means for coupling said conduit to a tank fill pipe, said conduit extending downward from said coupling means.

29. The level sensor mechanism of claim 26, further comprising:

a cable conduit positioned in said sensor assembly body, said cable conduit being adapted to receive cable the cable from a sensor.

* * * * *